(12) United States Patent
Feng et al.

(10) Patent No.: US 8,850,058 B2
(45) Date of Patent: Sep. 30, 2014

(54) ETHERNET-BASED DATA TRANSMISSION METHOD, ETHERNET NODES AND CONTROL SYSTEM

(75) Inventors: Dongqin Feng, Hangzhou (CN); Qiang Wang, Hangzhou (CN); Jian Chu, Hangzhou (CN); Jianxiang Jin, Hangzhou (CN)

(73) Assignees: Supcon Group Co., Ltd., Hangzhou, Zhejiang Province (CN); Zhejiang University, Hangzhou, Zhejiang Province (CN)

( * ) Notice: Subject to any disclaimer, the term of this patent is extended or adjusted under 35 U.S.C. 154(b) by 613 days.

(21) Appl. No.: 13/139,807

(22) PCT Filed: Apr. 9, 2010

(86) PCT No.: PCT/CN2010/071655
§ 371 (c)(1),
(2), (4) Date: Jun. 15, 2011

(87) PCT Pub. No.: WO2010/118669
PCT Pub. Date: Oct. 21, 2010

(65) Prior Publication Data
US 2011/0252158 A1    Oct. 13, 2011

(30) Foreign Application Priority Data

Apr. 15, 2009 (CN) .......................... 2009 1 0130848

(51) Int. Cl.
| | | |
|---|---|---|
| G06F 15/16 | (2006.01) | |
| H04L 12/931 | (2013.01) | |
| H04L 12/54 | (2013.01) | |
| H04J 3/06 | (2006.01) | |

(52) U.S. Cl.
CPC .............. H04L 12/56 (2013.01); H04L 49/351 (2013.01); H04J 3/0667 (2013.01)
USPC ........... 709/234; 709/201; 709/202; 709/203; 709/205; 709/206; 709/217; 709/218; 709/220; 709/221; 709/222; 709/223; 709/224; 709/225; 709/230; 709/231; 709/232; 709/233; 709/235; 709/236; 709/237; 709/238; 709/246; 709/247; 709/248; 709/249; 709/250; 709/251; 709/252; 709/253

(58) Field of Classification Search
CPC ....... H04J 3/0667; H04L 12/56; H04L 12/40; H04L 12/40058; H04L 12/40071; H04L 12/4015; H04L 12/43; H04L 12/437; H04L 12/46; H04L 49/351; H04L 49/352; H04L 29/06; H04L 29/06027; H04L 29/06462; H04L 29/0653; H04L 29/06095; H04L 29/08072; H04L 47/10; H04L 47/6215; H04L 49/90; H04L 12/5693; H04L 49/25
USPC ......... 709/201, 202, 203, 205, 206, 217, 218, 709/220, 221, 223, 224, 225, 230, 231, 232, 709/233, 234, 235, 236, 237, 238, 246, 247, 709/248, 249, 250, 251, 252, 253
See application file for complete search history.

(56) References Cited

U.S. PATENT DOCUMENTS

| | | | | |
|---|---|---|---|---|
| 6,742,136 | B2 * | 5/2004 | Christensen et al. | ......... 714/5.11 |
| 7,051,106 | B2 * | 5/2006 | Grobler et al. | ................ 709/228 |
| 7,761,901 | B2 * | 7/2010 | Walker et al. | ................... 725/95 |
| 7,945,682 | B2 * | 5/2011 | Hodson | ......................... 709/228 |
| 2002/0083364 | A1 * | 6/2002 | Christensen et al. | ........... 714/13 |
| 2006/0274754 | A1 | 12/2006 | Cho et al. | |
| 2007/0005720 | A1 * | 1/2007 | Neuhaus et al. | .............. 709/217 |
| 2009/0231996 | A1 | 9/2009 | Lauther | |

FOREIGN PATENT DOCUMENTS

| | | |
|---|---|---|
| CN | 1604554 A | 4/2005 |
| CN | 101075945 A | 11/2007 |
| CN | 100417122 C | 9/2008 |
| CN | 101534230 A | 9/2009 |
| JP | 11-101717 | 4/1999 |
| JP | 7005-03499 A | 3/2005 |
| JP | 2005-333584 A | 12/2005 |
| JP | 2006-148774 A | 6/2006 |
| WO | WO 2007/014856 A1 | 2/2007 |

OTHER PUBLICATIONS

Office action mailed Nov. 11, 2013 from corresponding Japanese Application No. 2011-546581 and English translation of same.

International Search Report dated Jul. 15, 2010 from corresponding International Application No. PCT/CN2010/071655.
Office action mailed Apr. 9, 2013 from corresponding Japanese Application No. 2011-546581 and English translation of same.

* cited by examiner

*Primary Examiner* — Saket K Daftuar
(74) *Attorney, Agent, or Firm* — Wolf, Greenfield & Sacks, P.C.

(57) ABSTRACT

The invention provides an Ethernet-based data transmission method, which is applied to a control system with a plurality of nodes. The method comprises: a first node caches the data needed to be sent (S101); if the current communication macro-cycle comprises the time segment for the first node to send data, the first node sends the cached data in the time segment for the first node to send data within the current communication macro-cycle; if the current communication macro-cycle does not comprise the time segment for the first node to send data, the first node does not send the cached data in the current communication macro-cycle; wherein other nodes do not send data in the time segment for the first node to send data within the current communication macro-cycle, and the communication macro-cycles have same durations and each communication macro-cycle consists of a plurality of time segments with a fixed length (S102). The invention further provides Ethernet nodes and a control system.

13 Claims, 8 Drawing Sheets

| destination address | source address | type | data | check code |
|---|---|---|---|---|
| 6 bytes | 6 bytes | 2 bytes | 46〜1500 bytes | 4 bytes |

| destination address | source address | type | requesting | authorizing | data | check code |
|---|---|---|---|---|---|---|
| 6 bytes | 6 bytes | 2 bytes | 1 bytes | 1 bytes | 44〜1498 bytes | 4 bytes |

ETHERNET-BASED DATA TRANSMISSION METHOD, ETHERNET NODES AND CONTROL SYSTEM

This application claims the benefit of priority to Chinese Patent Application No. 200910130848.5, entitled "ETHERNET-BASED DATA TRANSMISSION METHOD, ETHERNET NODES AND CONTROL SYSTEM", filed on Apr. 15, 2009 with State Intellectual Property Office of PRC, the content of which is incorporated herein by reference in its entirety.

FIELD OF THE INVENTION

The present disclosure relates to the field of numerical control technique, and particularly relates to Ethernet-based data transmission technique.

BACKGROUND OF THE INVENTION

With the rapid development of Ethernet technique, Ethernet communication is widely used in more and more communication systems. Ethernet has the advantages of popular usage, mature technology and low cost, and the communication speed of Ethernet communication is obviously superior to that of other conventional serial communications.

Presently, the Ethernet communication is used in some control systems, such as some numerical control systems. The control system includes at least one control device and at least one measuring and actuating equipment, with one control device controlling at least one measuring and actuating equipment.

In practical applications, Ethernet generally sends data by using Carrier Sense Multiple Access (CSMA)/Collision Detection (CD) mechanism. Specifically, each node (including the control device and the measuring and actuating equipment) inside the control system listens to the channel, and the node desired for data transmission can only send data when the channel is free.

However, if multiple nodes send data at the same time, then there may be transmission collision, so that some nodes or all the nodes desired for data transmission fail to send data.

One existing method for solving the above problem caused by collision is that, once a transmission collision is detected, the node desired for data transmission will back-off, that is to say, retrying the transmission after a period of time.

However, it is discovered by the inventors upon studying the above solution that, when the node desired for data transmission retries the transmission after a period of time, there is still possibility for transmission collision, and thus the node desired for data transmission can only wait for another period of time to retry the transmission. If this phenomenon continues, the node desired for data transmission is prevented from data transmission for quite a long time; it is even not sure when the transmission can take place. Therefore, the problem of transmission collision can not be radically solved by the existing back-off mechanism.

SUMMARY OF THE INVENTION

The present disclosure provides an Ethernet-based data transmission method, an Ethernet node and a control system, for radically solving the problem of transmission collision.

The present disclosure provides an Ethernet-based data transmission method for use in a control system including a plurality of nodes. The data transmission method includes: buffering, by the first node, data to be sent; and if a current communication macro cycle includes a time period for the first node to send data, sending, by the first node, the buffered data in the time period for the first node to send data within the current communication macro cycle, and if the current communication macro cycle does not include the time period for the first node to send data, not sending, by the first node, the buffered data within the current communication macro cycle; where other nodes do not send data in the time period for the first node to send data within the current communication macro cycle, each communication macro cycle has a same duration, and each communication macro cycle consists of a plurality of fixed duration time periods.

The present disclosure provides an Ethernet node for use in a control system with a plurality of Ethernet nodes. The Ethernet node includes: a buffering unit for buffering data to be sent; a first judging unit for determining, after the buffering unit buffers the data to be sent, whether a current communication macro cycle includes a time period for the Ethernet node to send data; and a data processing unit, if the first judging unit determines that the current communication macro cycle includes the time period for the Ethernet node to send data, the data processing unit sending the data buffered by the buffering unit, in the time period for the Ethernet node to send data within the current communication macro cycle, and if the first judging unit determines that the current communication macro cycle does not include the time period for the Ethernet node to send data, the data processing unit not sending the data buffered by the buffering unit, within the current communication macro cycle; wherein other nodes do not send data in the time period for the Ethernet node to send data within the current communication macro cycle, each communication macro cycle has a same duration, and each communication macro cycle consists of a plurality of fixed duration time periods.

The present disclosure provides a control system. The control system includes control device(s) and a plurality of measuring and actuating equipments, where the control device(s) controls at least one of the measuring and actuating equipments, and sends data in a time period for the control device(s) to send data within a communication macro cycle; the plurality of measuring and actuating equipments are controlled by the control device(s), and each of the measuring and actuating equipments sends data in the time period for the measuring and actuating equipment to send data within the communication macro cycle; and any one of the time periods in any communication macro cycle can be occupied by only one of the control device(s) and the plurality of measuring and actuating equipments, each communication macro cycle has a same duration, and each communication macro cycle consists of a plurality of fixed duration time periods.

In the present disclosure, each of the nodes in the control system sends data in the time period for the node to send data, so that the problem of transmission collision caused by multiple nodes sending data at the same time is solved. Moreover, it can be ensured that each of the nodes can send data in a determined time period, then the problem that the node desired to send data can not send data in quite a long period of time is solved.

DESCRIPTION OF THE PREFERRED EMBODIMENTS

Figure 1:
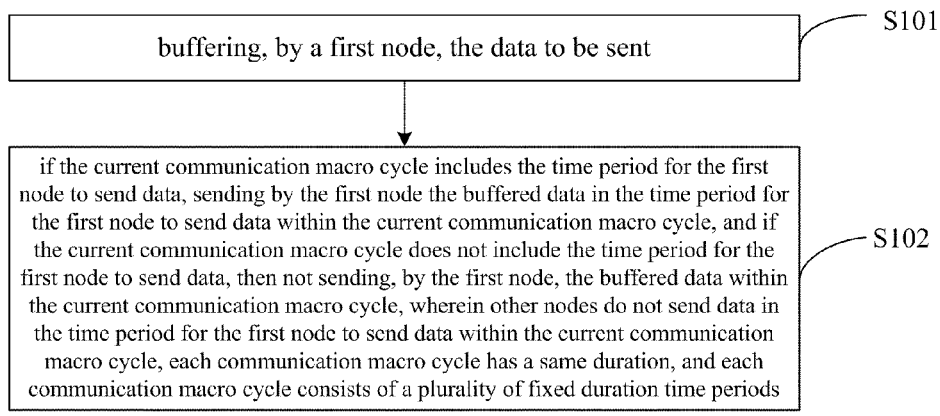
FIG. 1 is a flow chart of an Ethernet-based data transmission method according to the present disclosure.

The technical solutions of the embodiments of the present invention will be described clearly and completely in conjunction with the drawings. Apparently, the described embodiments are only some rather than all embodiments of the present invention. Any other embodiments obtained from the embodiments of the present invention by those skilled in the art without any inventive labor fall within the scope of the invention.

It should be noted that all the embodiments of the present disclosure are applicable in an Ethernet-based control system.

The control system may include a plurality of nodes, where at least one of the nodes is a control device for controlling the operation of other nodes, and at least one of the nodes is a measuring and actuating equipment with the main function of measuring and actuating, which is controlled by the control device. For example, the control system may be a numerical control system which includes at least one numerical control device and at least one servo driver controlled by the numerical control device.

Ethernet may be a local area network consists of various nodes in the control system, network bridges, switches and other devices. Ethernet may employ for example a star topologic structure, a daisy-chain topologic structure, a ring topologic structure, or the like. Of course, a hybrid structure of those structures is possible.

The communication macro cycle mentioned in all of the following embodiments refers to a cycle consists of a plurality of fixed-duration time periods, and each communication macro cycle has a same duration. The durations of respective time periods within a communication macro cycle may be set in accordance with the performances of corresponding nodes. In this case, it is possible that the all the time periods within a communication macro cycle have the same duration, or only a portion of the time periods have the same duration, or none of the time periods has the same duration. Generally speaking, any one of the time periods can only be occupied by one node for data transmission.

In the present disclosure, each communication macro cycle may be set by at least two methods.

In one of the methods, each of the time periods within each communication macro cycle is pre-assigned to one node. That is to say, each of the time periods pre-corresponds to one node, so that each of time periods will be occupied by one pre-assigned node for data transmission by the node. In practice, a same time period in each communication macro cycle can be assigned to a same node, so that this node will send data in the same time period within each communication macro cycle. For example, a first time period in each communication macro cycle is assigned to the control device for controlling the operation of other nodes, so that the control device sends data within the first time period in each communication macro cycle. Furthermore, the same time periods within different communication macro cycles can be assigned to different nodes. That is to say, transmissions of several nodes are multiplexed in the same time period. For example, assuming that the first time period within the nth (n is an integer) communication macro cycle is assigned to the control device, and the first time period within the (n+1)th communication macro cycle is assigned to the measuring and actuating equipment 1 in the control system, the first time period is occupied by the control device and the measuring and actuating equipment 1 in an alternating manner.

In the second method for setting the communication macro cycle, except for at least one time period pre-assigned to a node, a random time period is included in each communication macro cycle. The random time period is not pre-assigned to be occupied by a certain node, but is assigned to a node according to a certain scheme during the process that respective nodes transmit in their own time periods. For example, it is assumed that the communication macro cycle includes a first time period, a second time period, and a third time period that are pre-assigned, and further includes a random time period. The first time period, the second time period and the third time period can be respectively occupied by the pre-assigned nodes, and the random time period can only be occupied by a node that is authorized to occupy the random time period. In practical applications, one node may be authorized several times continuously to occupy the random time periods within different communication macro cycles. Of course, different nodes may be authorized to occupy the random time periods within different communication macro cycles. Furthermore, the durations of the random time periods in different communication macro cycles are generally the same.

Of course, the communication macro cycle may be set in other manners, and may be set flexibly by those skilled in the art as needed in particular applications. The communication macro cycles in all the following embodiments are mainly set by the above two methods, and other manners for setting the communication macro cycle will not be described in details herein.

An Ethernet-based data transmission method according to the present disclosure will be described hereinafter. As shown in FIG. 1, the method includes:

S101: buffering, by a first node, the data to be sent;

S102: if a current communication macro cycle includes a time period for the first node to send data, sending, by the first node, the buffered data in the time period(s) for the first node to send data within the current communication macro cycle; and if the current communication macro cycle does not include the time period for the first node to send data, not sending, by the first node, the buffered data within the current communication macro cycle; other nodes do not send data in the time period for the first node to send data within the current communication macro cycle; each communication macro cycle has a same duration, and each communication macro cycle consists of a plurality of fixed duration time periods.

Specifically, the data to be sent may be the data to be forwarded by the first node, or the data generated and to be sent by the first node.

After buffering the data to be sent, the first node may determine whether the current communication macro cycle includes the time period for the first node to send data.

If it is determined that the current communication macro cycle includes time period(s) for the first node to send data, the first node may send the buffered data in the time period(s) for the first node to send data within the current communication macro cycle. In practical applications, sometimes the amount of the buffered data may be relatively large. In this case, the first node can only send a portion of the buffered data in the time period(s) for the first node to send data within the current communication macro cycle, and the rest of the buffered data can be sent in one or more subsequent time periods for the first node to send data.

If the current communication macro cycle does not include the time period for the first node to send data, then the first node will not send the buffered data within the current communication macro cycle.

As mentioned above, any one time period can be occupied by only one pre-assigned node. That is to say, one time period can be occupied uniquely by only one node, and each time period can be pre-assigned to one node. Thus, after the control system is powered to operate, respective nodes will send data in the time periods pre-assigned to them.

As also mentioned above, each communication macro cycle may include a random time period, and the random time period will be occupied by a node which succeeds in requesting to occupy the random time period. Any one of the time periods other than the random time period within each communication macro cycle can only be occupied by one pre-assigned node. That is to say, one time period can be occupied by only one node, and each time period other than the random time period can be pre-assigned to one node. Furthermore, the random time period is not pre-assigned to a certain node, but is occupied by a node which succeeds in requesting to occupy the random time period. Thus, after the control system is powered to operate, each of the nodes will send data in the time period which is pre-assigned to the node and is not the random time period. Furthermore, all nodes may request for occupying the random time period, and if some node succeeds in requesting for occupying some random time period, this node sends data in this random time period.

It should be noted that, the data sent by the node in the time period pre-assigned to the node for data transmission may be data which is to be sent periodically and is real-time demanding, such as data closely related to measurement and controlling, including control word, state word, location, speed, torque or the like. The data sent by the node in the random time period may be data which is generated under particular conditions and is not real-time demanding, such as settings for device management and parameter configuration, such as IEEE1588 synchronization message, application layer service message and other general TCP/IP-based messages in the Information Technology field.

It also should be noted that, in a case that a random time period is included within the current communication macro cycle, if the random time period within the current communication macro cycle can not be occupied by the first node to send data, and the current communication macro cycle does not include a time period assigned to the first node, it may also be considered to be the case mentioned in S102 that the current communication macro cycle does not include a time period for the first node to send data.

Referring to S101 and S102 again, if the first node needs to request to a second node for occupying the random time period, then the first node can request for occupying the random time period within the next communication macro cycle to the second node during or after sending data in the time period for the first node to send data within the current communication macro cycle. If a response from the second node to occupy the random time period within the next communication macro cycle is received within the next communication macro cycle, the first node can send data in the random time period within the next communication macro cycle. Of course, if the next communication macro cycle includes the time period for the first node to send data, then the first node can also send data in the time period for the first node to send data within the next communication macro cycle. Preferably, the first node may set a field for requesting in the data to be sent to the second node, where the content of the field for requesting is for example a priority of the first node for transmission. The second node may set a field for authorizing in the data to be sent (or broadcasted) to the first node, wherein the content of the field for authorizing is for example an identifier of the first node. Hence, not only the data for transmission is sent but also the application and the authorization are finished by the first node and the second node, thereby saving the time and message resource.

If the first node is the node that authorizes other nodes to occupy the random time period, then before buffering the data to be sent, the first node may receive, within the previous communication macro cycle, the request sent by a third node for occupying the random time period within the current communication macro cycle. If the first node permits the third to occupy the random time period within the current communication macro cycle, then in the time period for the first node to send data within the current communication macro cycle, the first node may send a response to the third node, to permit the third node to occupy the random time period within the current communication macro cycle. Thus, the third node can send data in the random time period within the current communication macro cycle.

In the present disclosure, each of the nodes should send data in the time period(s) pre-assigned to the node or in the random time period that the node is authorized to occupy by requesting, and in order to ensure that each of the nodes may send data on time in the time period for the node to send data, it is preferable for the various nodes in the control system to adjust their local clocks from time to time. That is to say, it is preferable for the various nodes in the control system to perform network clock synchronization from time to time.

One way for clock synchronization is based on Simple Network Time Protocol (SNTP) or IEEE1588 protocol. Furthermore, the present disclosure further provides another way for clock synchronization.

Referring to S101 and S102 again, if the first node is not the clock source, then before the S102 is performed, after receiving first data sent by the clock source in a time period for the clock source to send data, the first node records the time when the first data arrives at the local. Then, the first node will receive second data sent by the clock source in another time period for the clock source to send data, where the second data includes the time when the clock source sends the first data. Thus, the first node may correct the local clock according to the time when the first data arrives at the local, the time when the clock source sends the first data, and the circuit delay between the first node and the clock source.

If the first node is the clock source, then when or after the S102 is performed, the first node records the time when the first node sends the data in the time period for the first node to send data within the current communication macro cycle. The node receiving data from the first node can record the time when the data is received. The time recorded by the first node can be included in the data sent by the first node in the next time period for the first node to send data. Thus, the node that receives twice from the first node may correct the local clock according to the time record by the first node, the recorded time when the data sent by the first node is received, and the circuit delay to the first node.

In specific implements, the control device is generally used as the clock source. Of course, other nodes may also be used as the clock source. The present disclosure is not limited in this regard, as long as the clock synchronization among the nodes may be ensured.

It should be noted that, the first node in S101 and S102 may be the control device in the control system, or may be the measuring and actuating equipment in the control system. For example, the first node may be the numerical control device in the numerical control system, or may be the servo driver in the numerical control system.

Figure 2:
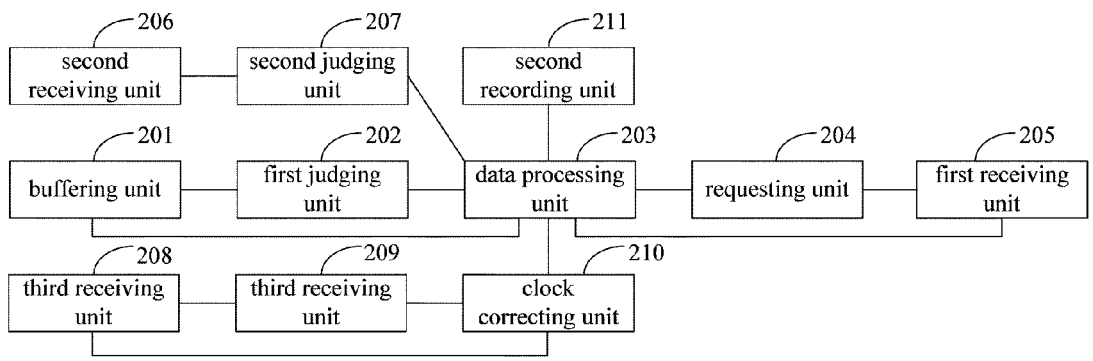
FIG. 2 is a schematic diagram of the logic structure of an Ethernet node according to the present disclosure.

Corresponding to the above Ethernet-based data transmission method, the present disclosure further provides an Ethernet node. As shown in FIG. 2, the node includes: a buffering unit 201 for buffering the data to be sent; a first judging unit 202 for determining, after the buffering unit 201 buffers the data to be sent, whether the current communication macro cycle includes a time period for the Ethernet node to send data; and a data processing unit 203, for sending, in the time period for the Ethernet node (specifically, the data processing unit 203) to send data within the current communication macro cycle the data buffered by the buffering unit 201 if the first judging unit 202 determines that the current communication macro cycle includes the time period for the Ethernet node (specifically, the data processing unit 203) to send data, and not sending within the current communication macro cycle the data buffered by the data buffering unit 201 if the first judging unit 202 determines that the current communication macro cycle does not include the time period for the Ethernet node (specifically, the data processing unit 203) to send data. Other nodes does not send data in the time period(s) for the Ethernet node (specifically, the data processing unit 203) to send data within the current communication macro cycle; each communication macro cycle has a same duration, and each communication macro cycle consists of a plurality of fixed duration time periods.

Specifically, the data to be sent may be the data to be forwarded by the Ethernet node shown in FIG. 2, and may also be the data generated and to be sent by the Ethernet node shown in FIG. 2.

In practical applications, sometimes the amount of the data buffered by the buffering unit 201 may be relatively large. In this case, the data processing unit 203 can only send a portion of the buffered data in the time period(s) for the data processing unit 203 to send data within the current communication macro cycle, and the rest of the buffered data can be sent in one or more subsequent time periods for the data processing unit 203 to send data.

As mentioned above, any one time period can be occupied by only one pre-assigned node. That is to say, one time period can be occupied uniquely by only one node, and each time period can be pre-assigned to one node. Thus, after the control system is powered to operate, respective nodes will send data in the time periods pre-assigned to them.

As also mentioned above, each communication macro cycle can include a random time period, and the random time period will be occupied by a node which succeeds in requesting to occupy the random time period. Any one of the time periods other than the random time period within each communication macro cycle can only be occupied by one pre-assigned node. That is to say, one time period can be occupied by only one node, and each time period other than the random time period can be pre-assigned to one node. Furthermore, the random time period is not pre-assigned to a certain node, but is occupied by a node which succeeds in requesting to occupy the random time period. Thus, after the control system is powered to operate, each of the nodes will send data in the time period which is pre-assigned to the node and is not the random time period. Furthermore, all nodes may request for occupying the random time period, and if some node succeeds in requesting for occupying some random time period, this node sends data in this random time period.

It should be noted that, the data sent by the node in the time period pre-assigned to the node for data transmission may be data which is to be sent periodically and is real-time demanding, such as data closely related to measurement and controlling, including control word, state word, location, speed, torque or the like. The data sent by the node in the random time period may be data which is generated under particular conditions and is not real-time demanding, such as settings for device management and parameter configuration, such as IEEE1588 synchronization message, application layer service message and other general TCP/IP-based messages in the Information Technology field.

It also should be noted that, in a case that a random time period is included within the current communication macro cycle, if the random time period within the current communication macro cycle cannot be occupied by the data processing unit 203 to send data, and the current communication macro cycle does not include a time period assigned to the node (specifically, the data processing unit 203) shown in FIG. 2, it may also be considered to be the case that the first judging unit 202 determines that the current communication macro cycle does not include the time period for the Ethernet node to send data.

The Ethernet nodes shown in FIG. 2 may further include: a requesting unit 204 for sending a request for occupying the random time period within a next communication macro cycle to a second Ethernet node, when or after the data processing unit 203 sends data in the time period for the Ethernet node (specifically, the data processing unit 203) shown in FIG. 2 to send data within the current communication macro cycle; and a first receiving unit 205 for receiving, within the next communication macro cycle, a response that the second Ethernet node permits the random period within the next communication macro cycle to be occupied, after the requesting unit 204 request to the second Ethernet node for occupying the random time period within the next communication macro cycle. If the first receiving unit 205 receives, within the next communication macro cycle, the response that the second Ethernet node permits the random period within the next communication macro cycle to be occupied, then the data processing unit 203 can send data in the random time period within the next communication macro cycle. Of course, if the next communication macro cycle includes the time period for the Ethernet node (specifically the data processing unit 203) shown in FIG. 2 to send data, then the data processing unit 203 can also send data in the time period for the processing unit 203 to send data within the next communication macro cycle. Preferably, the data processing unit 203 can set the field for requesting in the data to be sent to the second Ethernet node, where the content of the field for requesting is for example the priority of the Ethernet node shown in FIG. 2 to send data. The second Ethernet node can set the field for authorizing in the data to be sent (or broadcasted) to the Ethernet node shown in FIG. 2, where the content of the field for authorizing is for example an identifier of the Ethernet node shown in FIG. 2. Hence, not only the data for transmission is sent but also the application and the authorization are finished by the Ethernet node and the second Ethernet node shown in FIG. 2, thereby saving the time and message resource.

If the Ethernet node shown in FIG. 2 is the node that authorizes other nodes to occupy the random time period, then the Ethernet node shown in FIG. 2 may further include: a second receiving unit 206 for receiving, within a previous communication macro cycle, the request sent by the third Ethernet node for occupying the random time period within the current communication macro cycle, before the buffering unit 201 buffers the data to be sent; and a second judging unit 207, for determining, after the second receiving unit 206 receives the request sent by the third Ethernet node for occupying the random time period within the current communication macro cycle, whether the third Ethernet node is permitted to occupy the random time period within the current communication cycle. If the second judging unit 207 determines that the third Ethernet node is permitted to occupy the random time period within the current communication macro cycle, then the data processing unit 203 can send, in the time period for the data processing unit 203 to send data within the current communication macro cycle, a response that permits the random time period within the current communication macro cycle to be occupied, to the third Ethernet node. Thus, the third Ethernet node can send data in the random time period within the current communication macro cycle.

In the present disclosure, each of the nodes should send data in the time period(s) pre-assigned to the node or in the random time period that the node is authorized to occupy by requesting, and in order to ensure that each of the nodes can send data on time in the time period for the node to send data, it is preferable for the various nodes in the control system to adjust their local clocks from time to time. That is to say, it is preferable for the various nodes in the control system to perform network clock synchronization from time to time.

One way for clock synchronization is based on Simple Network Time Protocol (SNTP) or IEEE1588 protocol. Furthermore, the present disclosure further provides another way for clock synchronization.

Continuing referring to FIG. 2, if the Ethernet node shown in FIG. 2 is not the clock source, then the Ethernet node shown in FIG. 2 may further include: a third receiving unit 208 for receiving, before the data processing unit 203 sends the data buffered by the buffering unit 201, first data sent by the clock source in the time period for the clock source to sent data; and a first recording unit 209 for recording, after the third receiving unit 208 receives the first data sent by the clock source, the time when the first data arrives at the local. After receiving the first data, the third receiving unit 208 may further receive second data sent by the clock source in another time period for the clock source to send data, where the second data includes the time when the clock source sends the first data. The Ethernet node shown in FIG. 2 may further include a clock correcting unit 210 for correcting the clock of the Ethernet node shown in FIG. 2 according to the time when the first data arrives at the local, the time when the clock source sends the first data and the circuit delay between the Ethernet node and the clock source.

If the Ethernet node shown in FIG. 2 is the clock source, then the Ethernet node shown in FIG. 2 may further include: a second recording unit 211 for recording, when or after the data processing unit 203 sends the data buffered by the buffering unit 201, the time when the data is sent in the time period for the Ethernet node (specifically, the data processing unit 203) shown in FIG. 2 to send data within the current communication macro cycle. The node that receives the data sent by the Ethernet node (specifically, the data processing unit 203) shown in FIG. 2 can record the time when the data is received. The data processing unit 203 can include the time recorded by the second recording unit 211 in the data sent in the next time period for the Ethernet node (specifically, the data processing unit 203) shown in FIG. 2 to send data. Thus, the node that receives twice from the Ethernet node (specifically, the data processing unit 203) shown in FIG. 2 can correct the local clock according to the time recorded by the second recording unit 211, the time when the data sent by the Ethernet node (specifically, the data processing unit 203) shown in FIG. 2 is received, and the circuit delay between the node that receives twice from the Ethernet node shown in FIG. 2 and the Ethernet node.

It should be noted that, the Ethernet node shown in FIG. 2 may be the control device in the control system, and may also be the measuring and actuating equipment in the control system. For example, the Ethernet node shown in FIG. 2 may be the control device in the numerical control system, and may also be the measuring and actuating equipment in the control system.

In addition to the above Ethernet-based data transmission method and the above Ethernet node, the present disclosure further provides a control system. The control system includes: control device(s) and a plurality of measuring and actuating equipments. The control device(s) controls at least one of the measuring and actuating equipments and sends data in time period(s) for the control device(s) to send data within the communication macro cycle. The plurality of measuring and actuating equipments are controlled by the control device(s), and each of the measuring and actuating equipments sends data in time period(s) for the measuring and actuating equipment to send data within the communication macro cycle. Any one of the time periods in any communication macro cycle can be occupied by only one of the control device(s) and the plurality of measuring and actuating equipments for sending data, each communication macro cycle has a same duration, and each communication macro cycle consists of a plurality of fixed duration time periods.

As mentioned above, any one time period can be occupied by only one pre-assigned node. That is to say, one time period can be occupied uniquely by only one node, and each time period can be pre-assigned to one node. Thus, after the control system is powered to operate, respective nodes will send data in the time periods pre-assigned to them.

As also mentioned above, each communication macro cycle may include a random time period, and the random time period will be occupied by a node which succeeds in requesting to occupy the random time period. Any one of the time periods other than the random time period within each communication macro cycle can only be occupied by one pre-assigned node. That is to say, one time period can be occupied by only one node, and each time period other than the random time period can be pre-assigned to one node. Furthermore, the random time period is not pre-assigned to a certain node, but is occupied by a node which succeeds in requesting to occupy the random time period. Thus, after the control system is powered to operate, each of the nodes will send data in the time period which is pre-assigned to the node and is not the random time period. Furthermore, all nodes may request for occupying the random time period, and if some node succeeds in requesting for occupying some random time period, this node sends data in this random time period.

It should be noted that, the data sent by the node in the time period pre-assigned to the node for data transmission may be data which is to be sent periodically and is real-time demanding, such as data closely related to measurement and controlling, including control word, state word, location, speed, torque or the like. The data sent by the node in the random time period may be data which is generated under particular conditions and is not real-time demanding, such as settings for device management and parameter configuration, such as IEEE1588 synchronization message, application layer service message and other general TCP/IP-based messages in the Information Technology field.

In the time period for each measuring and actuating equipment to send data, the measuring and actuating equipment can request for occupying the random time period within the next communication macro cycle to the control device(s); in the time period for the control device(s) to send data within the next communication macro cycle, the control device(s) can send a response to one of all the measuring and actuating equipments that request, to permit the random time period within the next communication macro cycle to be occupied. Preferably, the measuring and actuating equipments may set the field for requesting in the data to be sent to the control device(s), where the content of the field for requesting is for example the priority of the measuring and actuating equipments to send data. The control device(s) may set the field for authorizing in the data to be sent (or broadcasted) to the measuring and actuating equipments, where the content of the field for authorizing is for example an identifier of the corresponding measuring and actuating equipment, so that not only the data for transmission is sent but also the application and the authorization are finished by the control device(s) and the measuring and actuating equipments, thereby saving the time and message resource.

The measuring and actuating equipment(s) controlled directly by the control device(s) is referred to as first level measuring and actuating equipment(s), and each of the first level measuring and actuating equipment(s) controls directly at least one second level measuring and actuating equipment; in the time period for each second level measuring and actuating equipment to send data, the second level measuring and actuating equipment may request for occupying the random time period in the next communication macro cycle to the first level measuring and actuating equipment that controls directly the second level measuring and actuating equipment; each first level measuring and actuating equipment may select, from the second level measuring and actuating equipments that are controlled directly by the first level measuring and actuating equipment, one second level measuring and actuating equipment that is permitted to occupy the random time period in the next communication macro cycle, and can send, in the time period for the first level measuring and actuating equipment to send data, a request for occupying the random time period in the next communication macro cycle to the control device(s), where the request includes information for identifying the selected second level measuring and actuating equipment. In the time period for the control device(s) to send data within the next communication macro cycle, the control device(s) can send a response to permit the random time period in the next communication macro cycle to be occupied to one of all the first level measuring and actuating equipments that send the request; and the one of all the first level measuring and actuating equipments sends a response to the selected second level measuring and actuating equipment, to permit the random time period in the next communication macro cycle to be occupied. Of course, a third level measuring and actuating equipment or other levels of measuring and actuating equipments may also participate in the requesting and the authorizing. That is to say, the requesting and the authorizing may be performed in a plurality of levels.

In the present disclosure, each of the devices should send data in the time period pre-assigned to the device itself or in the time period that the device is authorized to occupy by means of requesting. In order to ensure that each of the devices can send data on time in the time period for itself to send data, it is preferable for the various devices in the control system to adjust their local clocks from time to time, i.e., to perform network clock synchronization from time to time.

One way for clock synchronization is based on Simple Network Time Protocol (SNTP) or IEEE1588 protocol. Furthermore, the present disclosure further provides another way for clock synchronization.

If the control device is the clock source, then when or after transmitting the first data, the control device can record the time when the first data is sent; the measuring and actuating equipment that receives the first data can record the time when the first data arrives at the local; second data sent by the control device in the next time period for the control device to send data may include the time when the first data is sent; and after receiving the second data, the measuring and actuating equipment that receives the first data may correct the local clock according to the time when the control device sends the first data, the time when the first data arrives at the local, and the circuit delay between the local and the control device.

In specific implements, the control device is generally used as the clock source. Of course, a certain measuring and actuating equipment may also be used as the clock source. The present disclosure is not limited in this regard, as long as the clock synchronization among the devices may be ensured.

It should be noted that, the above control system is for example a numerical control system, the control device is for example a numerical control device in the numerical control system, and the measuring and actuating equipment is for example a servo driver in the numerical control system.

To understand the present disclosure more clearly by those skilled in the art, several preferred embodiments of the present disclosure will be described hereinafter by taking the numerical system as an example.

First Preferred Embodiment

Figure 3:
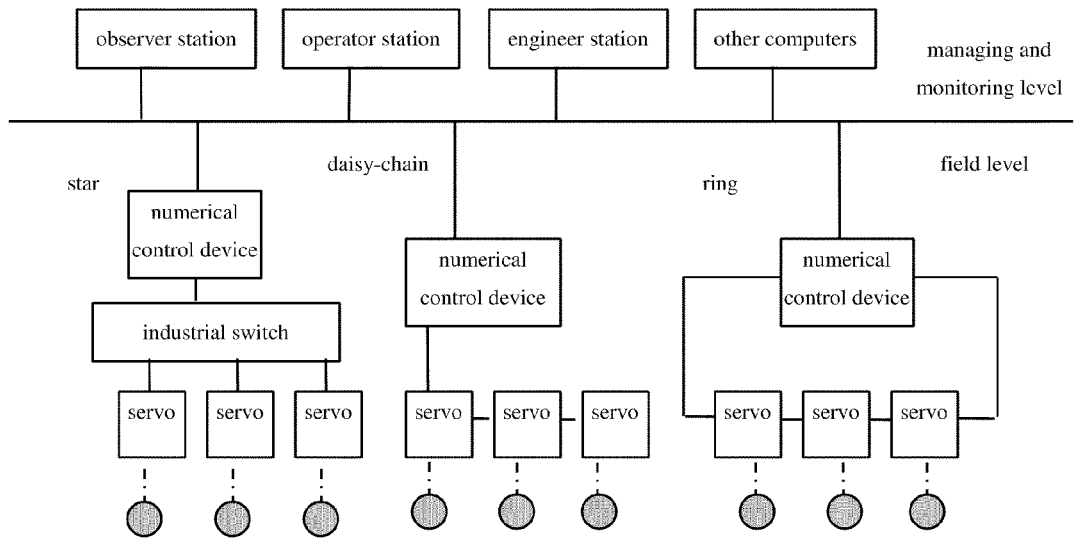
FIG. 3 is a schematic diagram of several topologic structures adopted by the Ethernet according to the present disclosure.

FIG. 3 shows a star topologic structure, a daisy-chain topologic structure, or a ring topologic structure of the Ethernet of the present disclosure. In the first preferred embodiment, the Ethernet is in a star topologic structure, as shown in FIG. 3, in which the local area network consists of one numerical control device, three servo drivers and one industrial switch.

Figure 4:
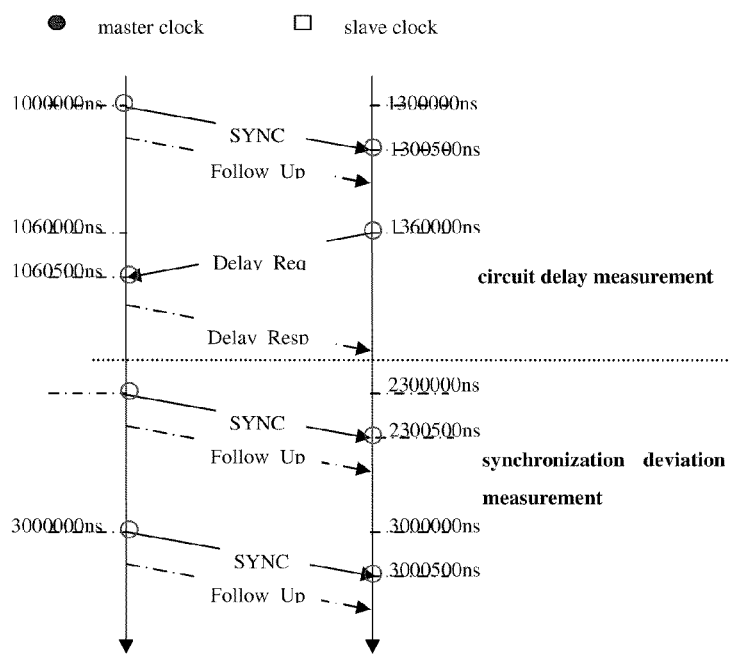
FIG. 4 is a schematic diagram of the clock synchronization process based on IEEE1588 Precision Clock Synchronization Protocol according to the present disclosure.

As shown in FIG. 4, the clock is synchronized based on IEEE1588 Precision Clock Synchronization Protocol, and it is set that the numerical control device is the master clock (i.e. the clock source), the servo driver is the slave clock, and synchronization is performed between the master clock and the slave clock. After the numerical control system is powered, each servo driver measures the circuit delay between the numerical control device and the servo driver, and stores the delay. The circuit delay is measured by the following method:

The numerical control device sends a synchronization (SYNC) message, records the SYNC message transmission time: $Ts_n=1000000$ ns, and carries the time stamp (i.e. the transmission time $Ts_n$) in the Follow_Up message to send to the servo driver;

The servo driver receives the SYNC message and records the SYNC message arrival time: $Td_n=1300500$ ns;

The servo driver receives the Follow_Up message, and obtains the transmission time $Ts_n$ that the numerical control device sends the SYNC message;

The servo driver sends a Delay_Req message, and records the Delay_Req message transmission time: $Ts_{n+1}=1360000$ ns;

The numerical control device receives the Delay_Req message, records the Delay_Req message arrival time: $Td_{n+1}=1060500$ ns, and carries the time stamp (i.e. the arrival time $Td_{n+1}$) in the Delay_Rsp message to send to the servo driver;

After receiving the Delay_Rsp message, the servo driver calculates the circuit delay by the following formula:

$$\begin{aligned} \text{Delay}_n &= \frac{(Td_{n+1} - Ts_{n+1}) + (Td_n - Ts_n)}{2} \\ &= \frac{(1060500 - 1360000) + (1300500 - 1000000)}{2} \\ &= 500 \text{ ns} \end{aligned}$$

Subsequently, the numerical control device periodically sends SYNC messages, and the servo driver that receives the SYNC messages synchronizes with the numerical control device that sends the SYNC messages. The numerical control device and each servo driver maintain a related clock, and each servo driver periodically synchronizes its clock with that of the numerical control device and corrects the local clock.

The deviation in synchronization may be calculated by using the following method:

The numerical control device sends a SYNC message, records the SYNC message transmission time: $Ts_{n+2}=2000000$ ns, and carries the time stamp (i.e. the transmission time $Ts_{n+2}$) in the Follow_Up message to send to the servo driver;

The servo driver receives the SYNC message, and records the SYNC message arrival time: $Td_{n+2}=2300500$ ns;

The servo driver receives the Follow_UP message, and obtains the transmission time $Ts_{n+2}$ that the numerical control device sends the SYNC message; and The servo driver calculates the deviation in synchronization by using the following formula:

$$\begin{aligned} \text{Offset}_n &= Td_{n+2} - Ts_{n+2} - \text{Delay}_n \\ &= 2300500 - 2000000 - 500 \\ &= 300000 \text{ ns} \end{aligned}$$

The synchronization is completed until the $\text{Offset}_n$ is subtracted from the local clock by the servo driver. After the clock synchronization is completed, the communication scheduling is started, and then the numerical control device and each servo driver send data according to the communication scheduling scheme, i.e., starting the data transmission process.

Figure 5:
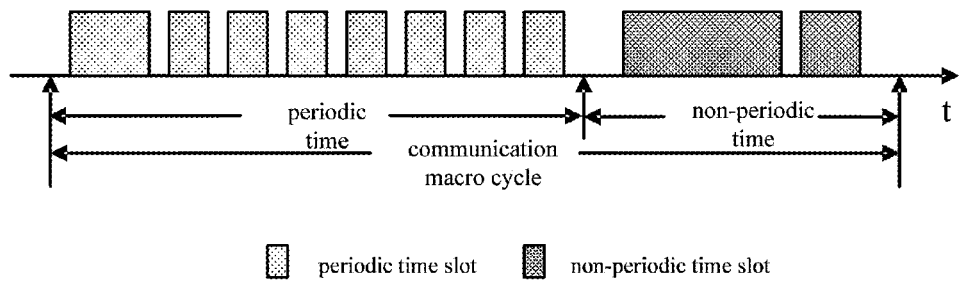
FIG. 5 is a schematic diagram of a method for setting a communication macro cycle according to the present disclosure.

As shown in FIG. 5, in the first preferred embodiment, the communication macro cycle includes random time period(s). The periodic time shown in FIG. 5 refers to the time range pre-assigned to device(s), and includes a plurality of time slots (i.e. time periods), with each time period being pre-assigned to one device. The non-periodic time shown in FIG. 5 refers to the random time period(s).

Figure 6:
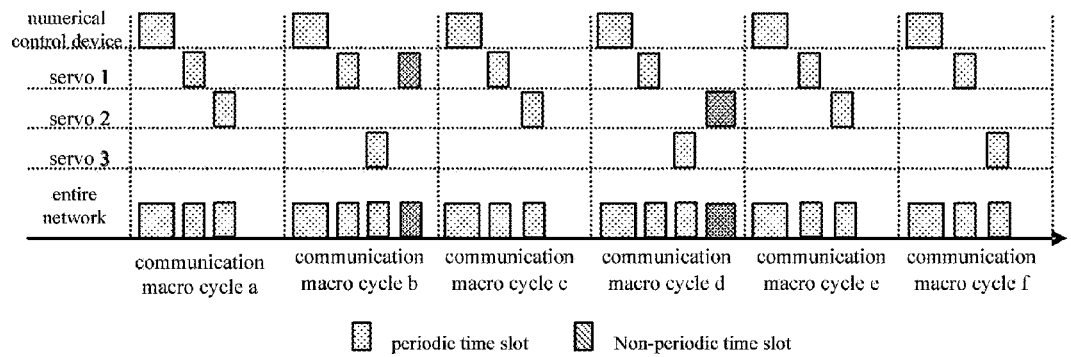
FIG. 6 is a schematic diagram of the data transmission pattern based on the communication macro cycle shown in FIG. 5 according to the present disclosure.

As shown in FIG. 6, the numerical control device and the servo driver 1 (referred to as the servo 1 in FIG. 6) send data (for example, data to be sent periodically, referred to as periodic data) in respective time slots within each communication macro cycle, the servo driver 2 (referred to as servo 2 in FIG. 6) and the servo driver 3 (referred to as servo 3 in FIG. 6) share a same time slot by alternately sending data (for example, data to be sent periodically, referred to as periodic data). In the communication macro cycle a, the servo driver 1 requests for sending data that can be sent non-periodically (referred to as non-periodic data) by using the requesting field in the periodic data. In the communication macro cycle b, the numerical control device instructs, by using the authorizing field in the periodic data, the servo driver 1 to send non-periodic data in the non-periodic time within the communication macro cycle b. After being authorized, the servo driver 1 sends non-periodic data in the non-periodic time within the communication macro cycle b.

Figures 7, 8:
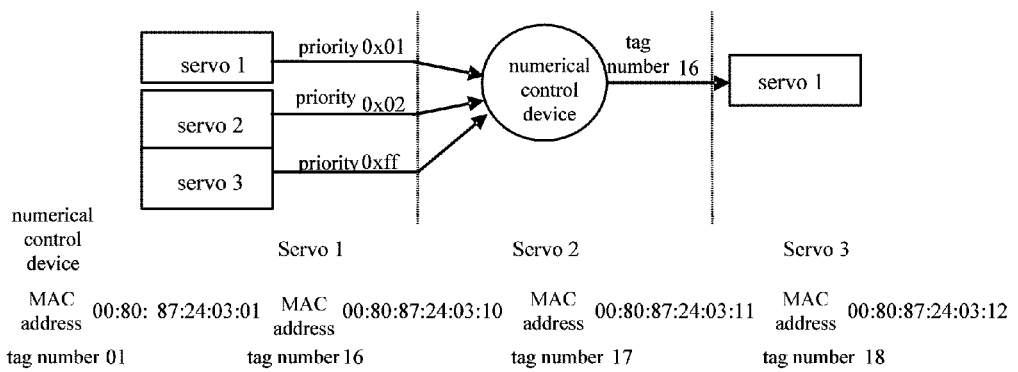
FIG. 7 is schematic structural diagram of periodic data according to the present disclosure.
FIG. 8 is a schematic diagram of a requesting and authorizing process according to the present disclosure.

As shown in FIG. 7, the requesting field and the authorizing field are inserted into the periodic data, and these two fields can be maintained by a communication scheduling and managing sub-layer in the data link layer. In the first preferred embodiment, the requesting field is maintained by each servo driver, and the communication scheduling and managing sub-layer in the servo driver writes the highest priority in the queue of non-periodic data of the local device into the requesting field. The authorizing field is maintained by the numerical control device. That is to say, only the authorizing field in the periodic data sent by the numerical control device is meaningful. The communication scheduling and managing sub-layer in the numerical control device processes the requesting field sent by respective servo drivers, and authorizes one of the servo drivers to send the non-periodic data by designating the tag number of this servo driver.

As shown in FIG. 8, in the first preferred embodiment, the priority scheduling scheme is adopted. That is to say, the numerical control device decides which servo driver to occupy the non-periodic time according to the priority of the non-periodic data to be sent by respective servo drivers. Assuming that in a certain communication macro cycle, the servo driver 1 (referred to as servo 1 in FIG. 6) requests for sending the non-periodic data with the priority of 0x1, the servo driver 2 (referred to as servo 2 in FIG. 6) requests for sending the non-periodic data with the priority of 0x2, and the servo driver 3 (referred to as servo 3 in FIG. 6) has no non-periodic data to send and sets the requesting field as a reserved value 0xff. In the next communication macro cycle, the numerical control device instructs the servo driver 1 to send non-periodic data in the non-periodic time within the next communication macro cycle, by designating the tag number 16.

Figure 9:
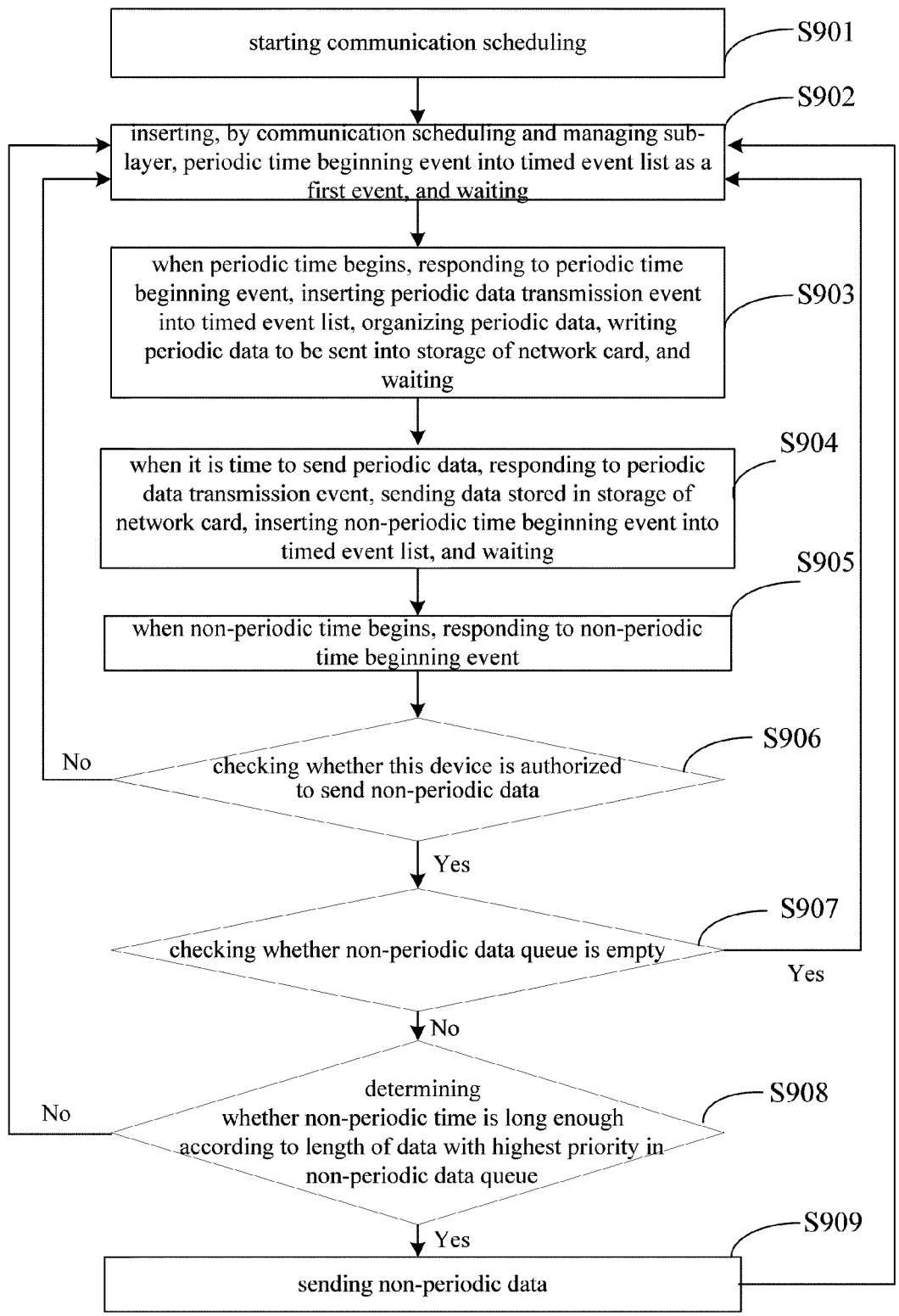
FIG. 9 flow chart of the communication scheduling management performed by a device according to the present disclosure.

As shown in FIG. 9, the communication scheduling and managing may be implemented as event-triggered, and the communication scheduling and managing is done in the term of one device. The specific flow is as follows:

S901: starting the communication scheduling;

S902: inserting, by the communication scheduling and managing sub-layer, a periodic time beginning event into the timed event list as a first event, and waiting;

S903: when the periodic time begins, responding to the periodic time beginning event, inserting a periodic data transmission event into the timed event list, organizing the periodic data, writing the periodic data to be sent into the storage of the network card, and waiting;

S904: when it is time to send the periodic data, responding to the periodic data transmission event, sending the data in storage of the network card, inserting a non-periodic time beginning event into the timed event list, and waiting;

S905: when the non-periodic time starts, responding to the non-periodic time beginning event;

S906: checking whether the present device is authorized to send the non-periodic data; if this device is authorized, then turning to S907; if this device is not authorized, turning to S902;

S907: checking whether the non-periodic data queue is empty; if the non-periodic data queue is not empty, turning to S908; if the non-periodic data queue is empty, turning to S902;

S908: determining whether the non-periodic time is long enough from the length of the data with the highest priority in the non-periodic data queue; if the non-periodic time is long enough to send the non-periodic data, then turning to S909; and if the non-periodic time is not long enough to send the non-periodic data, then turning to S902;

S909: sending the non-periodic data, and turning to S902.

Figure 10:
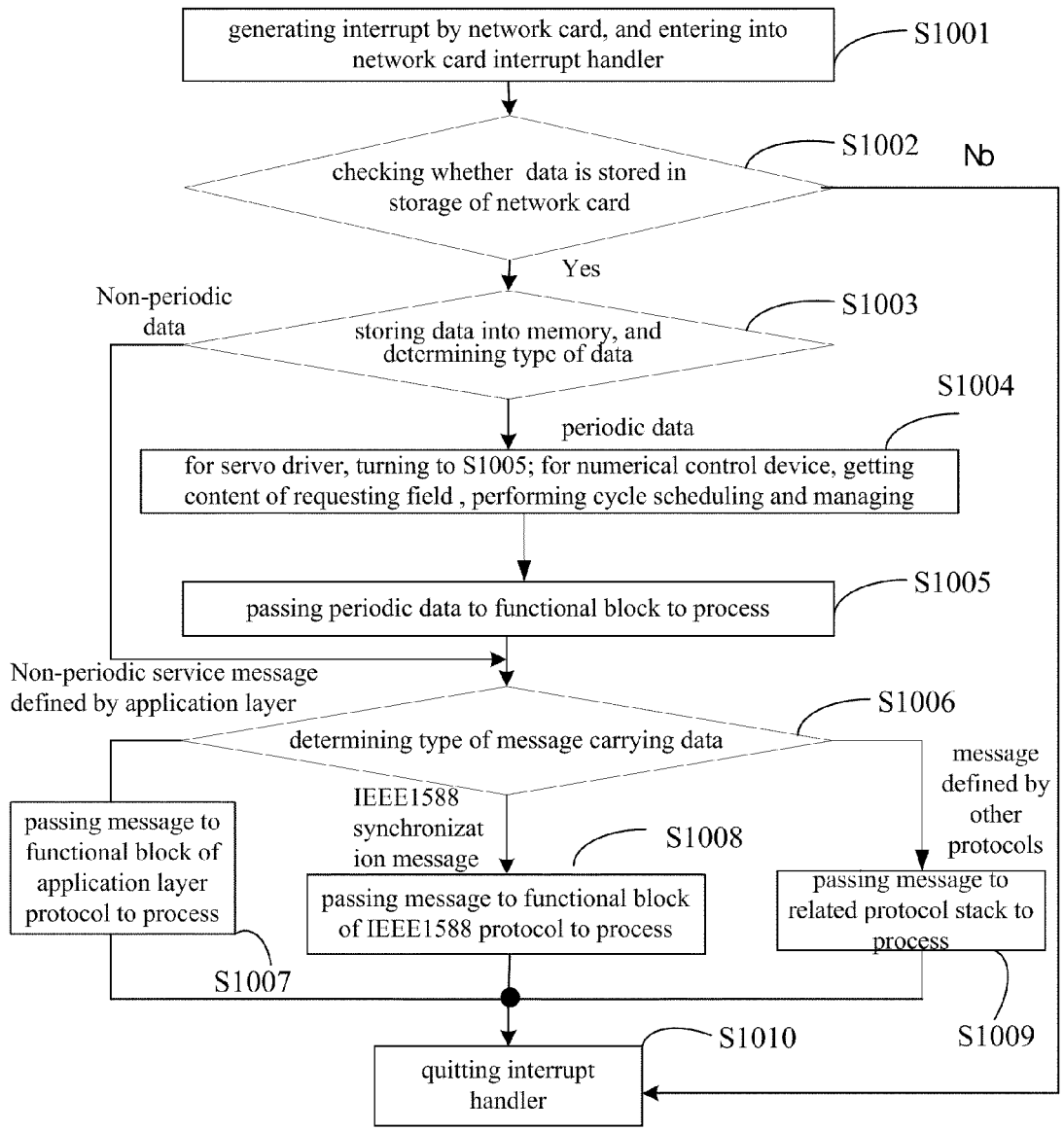
FIG. 10 is a flow chart of data processing by a device according to the present disclosure.

As shown in FIG. 10, when waiting, the numerical control device and respective servo drivers can process the received data. The data may be received in an interrupt mode or in a query mode. In the first preferred embodiment, the data is received in the query mode.

S1001: generating an interrupt by the network card, and executing a network card interrupt handler;

S1002: checking whether there is data in the storage of the network card; if there is data in the storage of the network card, then turning to S1003; if there is no data in the storage of the network card, turning to S1010;

S1003: storing the data into the memory, and determining the type of the data. And if the data is the periodic data, then turning to S1004; and if the data is the non-periodic data, then turning to S1006;

S1004: for the servo driver, turning to S1005; for the numerical control device, getting the content of the requesting field, performing the cycle scheduling and managing, and then turning to S1005. Specifically, if the current recorded priority is 0xff, and the priority in the requesting field is not 0xff, then recording the priority in the requesting field, and recording the tag number of the servo driver; if the current recorded priority is not 0xff, then comparing the priority in the requesting field with the current recorded priority, and if the priority in the requesting field is higher, then recording the priority in the requesting field, and recording the tag number of the servo driver;

S1005: passing the periodic data to a functional block to process;

S1006: determining the type of the message carrying the data; if the message carrying the data is a non-periodic service message defined by the application layer, then turning to S1007; if the message is an IEEE1588 synchronization message, then turning to S1008; and if the message is a message defined in other protocols, such as a message defined by TCP/IP or other real-time Ethernet techniques, then turning to S1009;

S1007: passing the message to a functional block of the application layer protocol to process, and turning to S1010;

S1008: passing the message to a functional block of IEEE1588 protocol to process, and turning to S1010;

S1009: passing the message to a related protocol stack to process, and turning to S1010;

S1010: quitting the interrupt handler.

Second Preferred Embodiment

The second preferred embodiment differs from the first preferred embodiment in that: in the second preferred embodiment, a daisy-chain topologic structure of the Ethernet is adopted, the clock synchronization is implemented by carrying the time stamp in the data to be sent, and the communication macro cycle does not include the random time period.

Figure 11:
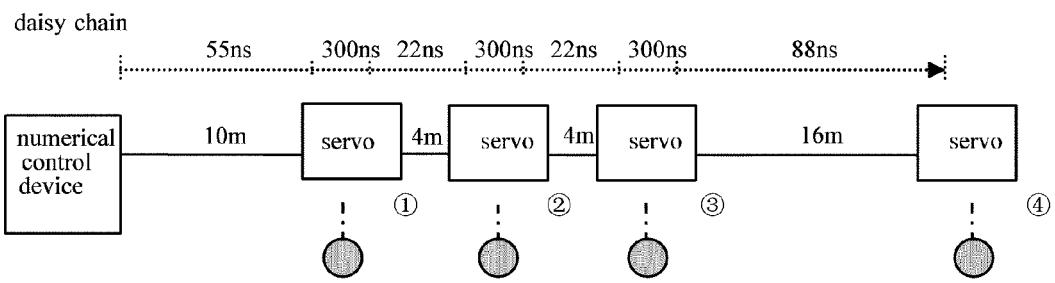
FIG. 11 is a schematic diagram of the daisy-chain structure adopted by the Ethernet according to the present disclosure.

As shown in FIG. 11, the numerical control system includes one numerical control device and four servo drivers (referred to as servos in FIG. 11). The signal transmission delay on twisted-pair is 5.5 ns/m, and the delay caused by each device is 300 ns. The circuit delay between respective servo drivers and the numerical control device is the sum of the transmission delay caused by line and the delay caused by the devices. For example, the circuit delay $Delay_n$ between the servo driver 4 and the numerical control device is: 55 ns+300 ns+22 ns+300 ns+22 ns+300 ns+88 ns=1087 ns.

Figure 12:
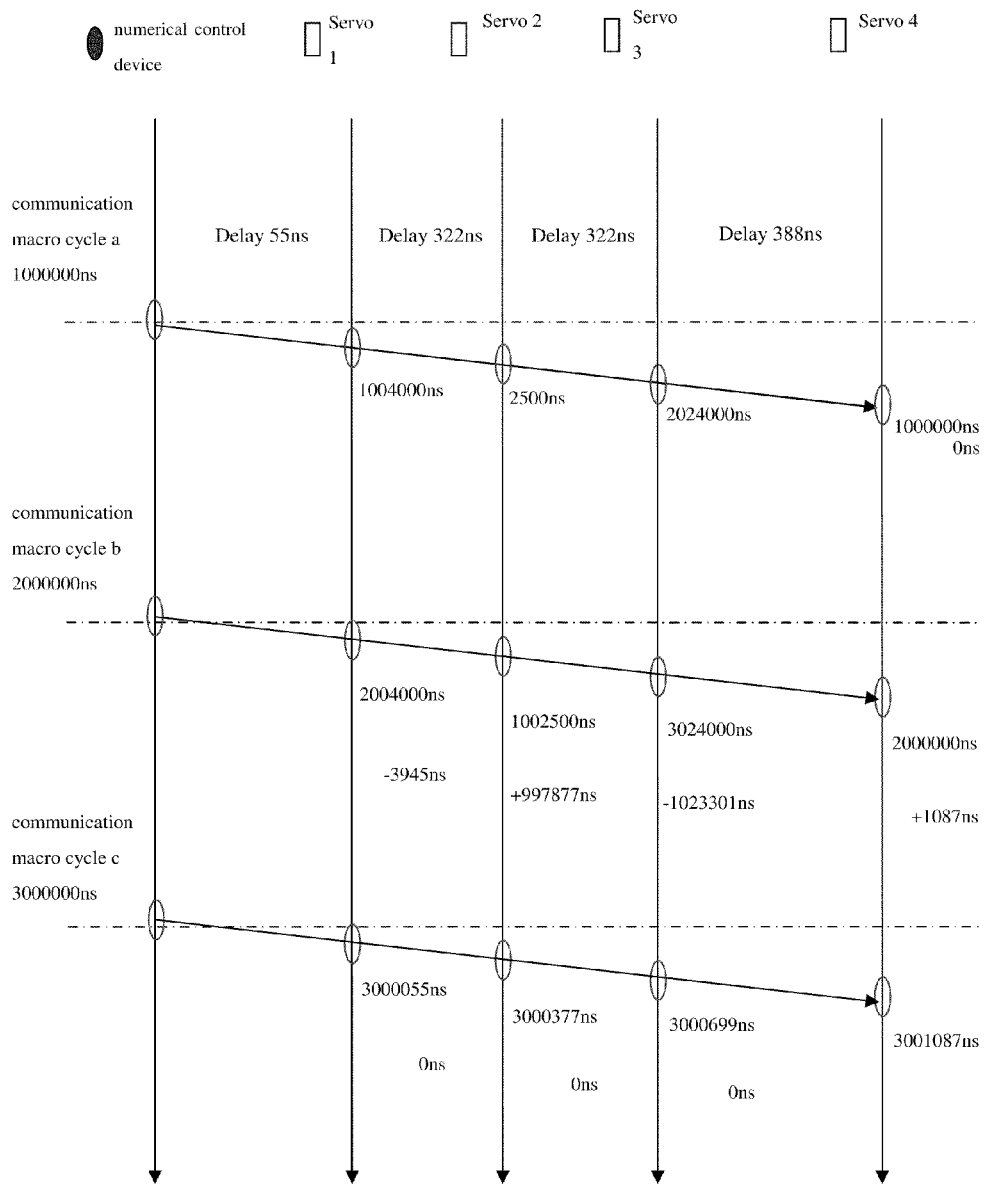
FIG. 12 is a schematic diagram of clock synchronization process according to the present disclosure.

As shown in FIG. 12, the clock synchronization is implemented by carrying the time stamp in the data to be sent. The previously recorded time of the last transmission of periodic data is included in the periodic data sent by the numerical control device. For example, in the communication macro cycle a, the numerical control device sends the periodic data and records the data transmission time $Ts_n$; and in the communication macro cycle b, the data transmission time $Ts_n$ is carried in the data to be sent. In the communication macro cycle a, the servo driver 4 (referred to as servo 4 in FIG. 12) receives the periodic data sent by the numerical control device and records the data arrival time $Td_n$. After receiving the data carrying the data transmission time $Ts_n$, the servo driver 4 calculates the clock synchronization deviation by the following formula:

$$\begin{aligned} Offset_n &= Td_n - Ts_n - Delay_n \\ &= 1000000 - 1000000 - 1087 \\ &= -1087 \text{ ns} \end{aligned}$$

Figure 13:
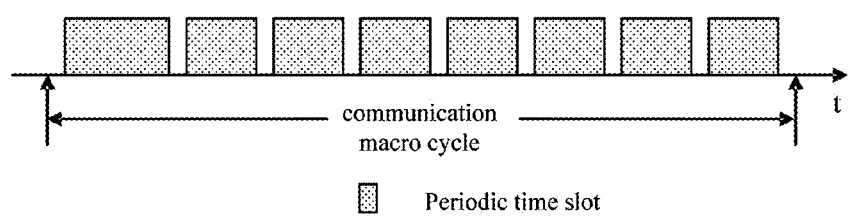
FIG. 13 is a schematic diagram of another method for setting the communication macro cycle according to the present disclosure.

As shown in FIG. 13, the communication macro cycle includes only the periodic time but not the non-periodic time.

Figure 14:
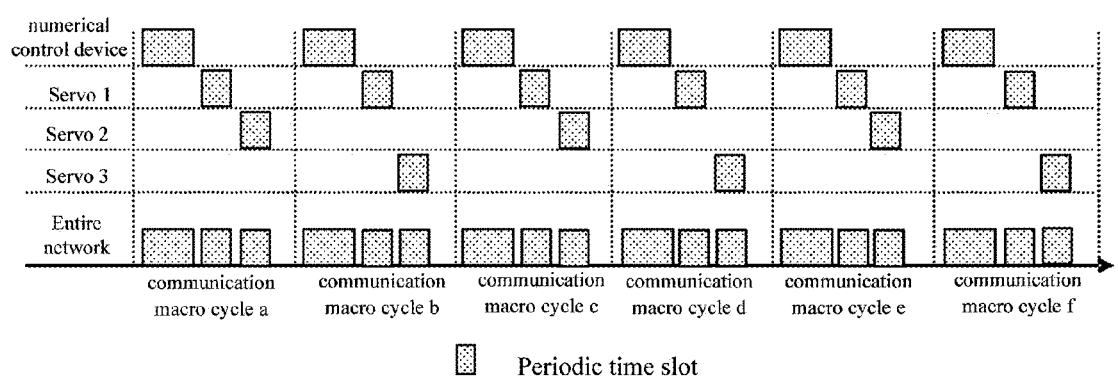
FIG. 14 is a schematic diagram of the data transmission pattern based on the communication macro cycle in FIG. 13 according to the present disclosure.

As shown in FIG. 14, each device periodically sends data in the assigned time slots. The sent data may include synchronization data, real-time data and non-real-time data.

The communication macro cycle does not include the non-periodic time, so after a periodic data transmission event is triggered, the periodic time beginning event is inserted into the timed event list.

After receiving the periodic messages, each device extracts data from the periodic messages and selects a corresponding processing way according to the data type. Among others, synchronization data is information used for clock synchronization; real-time data is generally data related to controlling and is real-time demanding, which will be sent to associated function blocks to process; non-real-time data includes data for the application layer services, TCP/IP protocol or other protocols, which is not real-time demanding. If the length of the non-real-time data area in the periodic data is shorter than the length of the data to be sent, then transmission may be performed for several times. For example, the data in the non-real-time data area may be divided to be sent, and the receiving side can recombine the non-real-time data received separately and then pass the combined non-real-time data to the related protocol blocks to process.

To sum up, in the present disclosure, each of the nodes in the control system sends data in the time period(s) for the node to send data, so that the problem of transmission collision caused when multiple nodes sends data at the same time is solved. Moreover, it can be ensured that each of the nodes can send data at a determined time point, and the problem that a node desired for data transmission can not send data in quite a long period of time is solved.

Furthermore, in the present disclosure, the process of requesting for occupying the random time period and the process of authorizing to occupy the random time period may be implemented by means of sending data from the nodes, then not only the time cost in requesting and authorizing may be saved, but also the message resources may be saved.

It should be noted that the Ethernet node provided by the present disclosure includes many virtual units, i.e. units realized by computer language sentences or a combination of the sentences. In practical applications, a combination of different sentences may implement different function, and in this case the division of the virtual units may be different. That is to say, the present disclosure provides only one exemplary division for the virtual units, and in practical applications those skilled in the art may employ different divisions as actual needed, as long as the function of the Ethernet node mentioned in the present disclosure may be realized.

Those skilled in the art may understand that all or part of the flows of the exemplary methods may be implemented with related hardware by following instructions of computer programs, in which the programs may be stored in a computer readable storage medium. When executed, the programs may implement the flows of the various methods. The storage medium may be a magnetic disk, an optical disk, a Read-Only Memory (ROM), or a Random Access Memory (RAM), etc.

The above descriptions are only preferred embodiments of the present invention, and are not intended to limit the present invention. Any modifications, equivalent alternatives, improvements and the like made within the spirits and the principles of the present invention should fall within the scope of the present invention.

The invention claimed is:

1. An Ethernet-based data transmission method for use in a control system, wherein the control system comprises a plurality of nodes and a switch, the plurality of nodes comprise at least one servo driver, and, the data transmission method comprises:
   buffering, by a first node in the plurality of nodes, data to be sent; and
   if a current communication macro cycle includes a time period for the first node to send data, sending, by the first node, the buffered data in the time period for the first node to send data within the current communication macro cycle, and if the current communication macro cycle does not include the time period for the first node to send data, not sending, by the first node, the buffered data within the current communication macro cycle,
   wherein other nodes do not send data in the time period for the first node to send data within the current communication macro cycle, each communication macro cycle has a same duration, and each communication macro cycle consists of a plurality of fixed duration time periods.

2. The method according to claim 1, wherein any one of the time periods is occupied by only one pre-assigned node.

3. The method according to claim 1, wherein each communication macro cycle includes a random time period, the random time period is occupied by a node which succeeds in requesting for occupying the random time period, and any one of the time periods other than the random time period within each communication macro cycle is occupied by only one pre-assigned node.

4. The method according to claim 3, further comprising: when or after sending data by the first node,
   requesting to a second node, by the first node, to occupy the random time period within a next communication macro cycle; and
   if receiving, within the next communication macro cycle, a response that the second node permits the random time period within the next communication macro cycle to be occupied, sending data in the random time period within the next communication macro cycle by the first node, and if the next communication macro cycle includes the time period for the first node to send data, further sending data in the time period for the first node to send data within the next communication macro cycle, by the first node.

5. The method according to claim 3, further comprising: before buffering by the first node the data to be sent,
   receiving, by the first node, within a previous communication macro cycle, a request sent by a third node for occupying the random time period within the current communication macro cycle; and
   if the first node permits the third node to occupy the random time period within the current communication macro cycle, sending, by the first node, in the time period for the first node to send data within the current communication macro cycle, a response to the third node for permitting the third node to occupy the random time period within the current communication macro cycle.

6. The method according to claim 1, wherein if the first node is not a clock source, the method further comprises:
   after receiving first data sent by the clock source in a time period for the clock source to send data, recording, by the first node, a time when the first data arrives at the local;
   receiving, by the first node, second data sent by the clock source in another time period for the clock source to send data, wherein the second data includes a time when the clock source sends the first data; and
   correcting, by the first node, a local clock, according to the time when the first data arrives at the local, the time when the clock source sends the first data, and a circuit delay between the first node and the clock source.

7. The method according to claim 1, wherein if the first node is a clock source, the method further comprises: recording, by the first node, a time when the buffered data is sent, wherein the data sent by the first node in a next time period for the first node to send data includes the time when the buffered data is sent.

8. A control system comprising a control device, a plurality of measuring and actuating equipments, and a switch wherein:
   the control device is connected to the plurality of measuring and actuating equipments via the switch;
   the control device controls at least one of the measuring and actuating equipments, and sends data in a time period for the control device to send data within a communication macro cycle;
   the plurality of measuring and actuating equipments are controlled by the control device, and each of the measuring and actuating equipments sends data in the time period for the measuring and actuating equipment to send data within the communication macro cycle; and
   any one of the time periods in any communication macro cycle is occupied by only one of the control device and the plurality of measuring and actuating equipments, each communication macro cycle has a same duration, and each communication macro cycle consists of a plurality of fixed duration time periods.

9. The system according to claim 8, wherein any one of the time periods is occupied by only one pre-assigned device.

10. The system according to claim 8, wherein each communication macro cycle includes a random time period, the random time period is occupied by one of the devices which succeeds in requesting for occupying the random time period, and any one of the time periods other than the random time period within each communication macro cycle is occupied by only one pre-assigned device.

11. The system according to claim 10, wherein:
each of the measuring and actuating equipments requests to the control device for occupying the random time period within a next communication macro cycle, in the time period for the measuring and actuating equipment to send data; and
in the time period for the control device to send data within the next communication macro cycle, the control device sends a response to permit the random time period within the next communication macro cycle to be occupied, to one of all the requesting measuring and actuating equipments.

12. The system according to claim 11, wherein:
the measuring and actuating equipment controlled directly by the control device is a first level measuring and actuating equipment, and each first level measuring and actuating equipment directly controls at least one second level measuring and actuating equipment;
each second level measuring and actuating equipment requests to the first level measuring and actuating equipment that directly controls the second level measuring and actuating equipment, in the time period for the second level measuring and actuating equipment to send data, for occupying the random time period in the next communication macro cycle;
each first level measuring and actuating equipment selects, from the second level measuring and actuating equipments that are controlled directly by the first level measuring and actuating equipment, one second level measuring and actuating equipment that is permitted to occupy the random time period in the next communication macro cycle, and sends, in the time period for the first level measuring and actuating equipment to send data, a request for occupying the random time period in the next communication macro cycle to the control device, wherein the request includes information for identifying the selected second level measuring and actuating equipment;

in the time period for the control device to send data within the next communication macro cycle, the control device sends a response to one of all the requesting first level measuring and actuating equipments, to permit the random time period in the next communication macro cycle to be occupied; and the one of all the requesting first level measuring and actuating equipments sends a response to the selected second level measuring and actuating equipment, to permit the random time period in the next communication macro cycle to be occupied.

13. The system according to claim 8, wherein:
the control device is a clock source, and when or after sending first data, the control device records the time when the first data is sent;
the measuring and actuating equipment that receives the first data records a time when the first data arrives at the local;
the control device includes the time when the first data is sent in second data sent in next time period for the control device to send data; and
after receiving the second data, the measuring and actuating equipment that receives the first data corrects a local clock according to the time when the control device sends the first data, the time when the first data arrives at the local, and a circuit delay between the local and the control device.

* * * * *